United States Patent [19]

Foley

[11] Patent Number: 5,163,518
[45] Date of Patent: Nov. 17, 1992

[54] DOWN FORCE ADJUSTMENT AND LIFT FOR AN OPENER SUPPORTED FROM A FRAME BY LIFT ARMS

[75] Inventor: Daniel M. Foley, Des Moines, Iowa
[73] Assignee: Deere & Company, Moline, Ill.
[21] Appl. No.: 748,124
[22] Filed: Aug. 21, 1991
[51] Int. Cl.⁵ .......................................... A01B 63/32
[52] U.S. Cl. .................................. 172/462; 172/500; 172/624.5; 111/62
[58] Field of Search ............... 172/462, 466, 484, 488, 172/497, 500, 624, 657, 668, 674, 675, 705; 111/54, 55, 61, 62, 66, 926

[56] References Cited

U.S. PATENT DOCUMENTS

| | | | |
|---|---|---|---|
| 2,225,393 | 12/1940 | Ray | 172/462 X |
| 2,580,480 | 1/1952 | Strohlow et al. | 172/624.5 X |
| 2,616,348 | 11/1952 | Ariens | 172/462 X |
| 3,601,202 | 8/1971 | Steffe | 172/462 |
| 4,116,140 | 9/1978 | Anderson | 172/500 X |
| 4,149,475 | 4/1979 | Bailey et al. | 172/462 X |
| 4,766,962 | 8/1988 | Frase | 172/624.5 |

Primary Examiner—Randolph A. Reese
Assistant Examiner—Jeffrey L. Thompson

[57] ABSTRACT

A plurality of parallel arm type openers are mounted on a frame tube, and a rockshaft is supported directly below the tube. Adjacent each of the openers, a lever arm is fixed for rotation with the rockshaft and, upon rotation of the rockshaft in a first direction, the lever arm engages the parallel arms to lift the opener while the frame tube remains stationary in the vertical direction. A tension spring assembly connected between the parallel arms and the lever arm applies varying down force when the opener is lowered by rotating the rockshaft in the opposite direction. The amount of down pressure can be adjusted for varying conditions by rotation of the rockshaft, and adjustment can be made on-the-go from the tractor cab to compensate for changing ground conditions in a given field. Locking structure on the row units permits selective lock-up of row units with a single cycle of the hydraulic lift system.

7 Claims, 3 Drawing Sheets

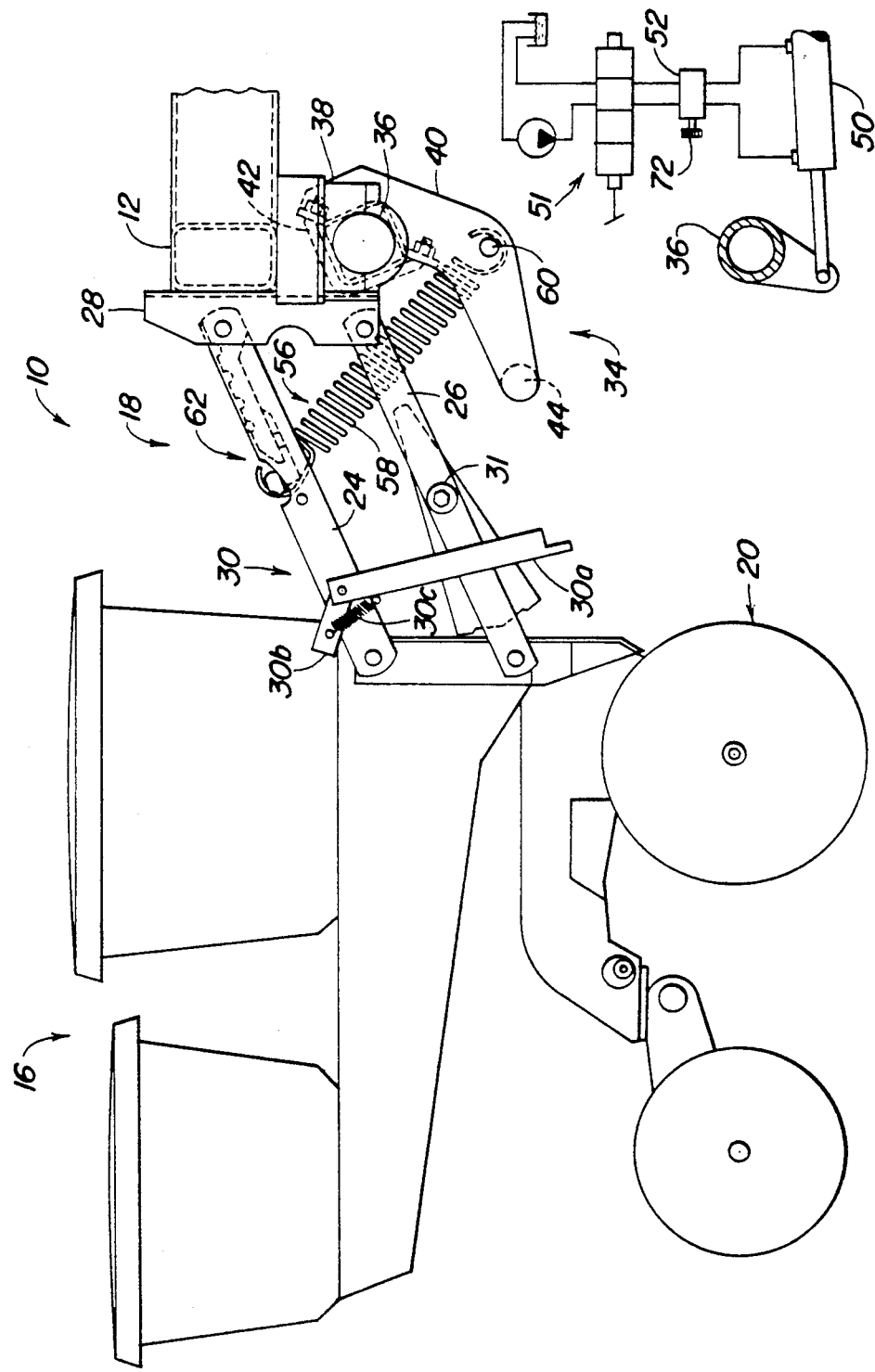

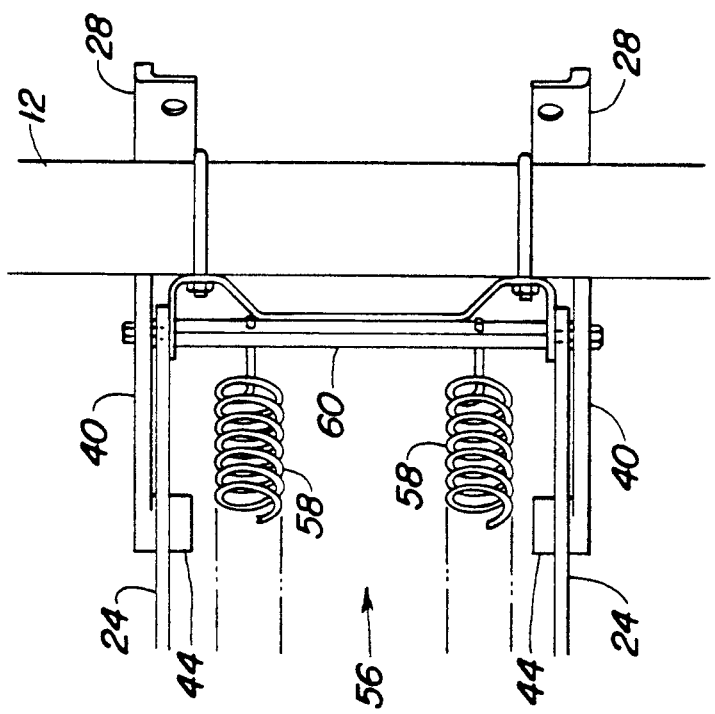

DOWN FORCE ADJUSTMENT AND LIFT FOR AN OPENER SUPPORTED FROM A FRAME BY LIFT ARMS

BACKGROUND OF THE INVENTION

1) Field of the Invention

The present invention relates generally to agricultural implements and, more specifically, to structure for lifting and adjusting the down pressure on planter row units.

2) Related Art

Planter row units are typically supported from a transverse frame by vertically spaced parallel arms which permit each row unit to move vertically to follow ground contour. For transport and turning at the end of the field, the entire frame must be lifted, and the lift force and therefore the lift time is substantially more than if individual units alone were raised without moving the frame vertically.

Down force on openers mounted with parallel arms is normally assisted with springs, and adjustments to the down force are made individually by hand for each row unit. Therefore, such adjustments are time-consuming and do not facilitate compensation for changing soil conditions in a given field. Down force can change significantly as the implement encounters irregular terrain.

In some applications, for example when changing from narrowly spaced rows to widely space rows, selected row units may be locked in a lifted position off the ground by utilizing latches. Heretofore, it has been necessary to set a lock up latch and use a pry bar to raise the individual row units to a position wherein the latch will trip automatically to the locking position. A considerable amount of time and effort is expended when a number of the units are locked in the raised position.

BRIEF SUMMARY OF THE INVENTION

It is therefore an object of the present invention to provide an improved row unit support arrangement which requires less lift force and lift time to raise the row unit openers than at least most previously available arrangements. It is a further object to provide such a support arrangement wherein down force adjustments are easily made and wherein the average down force on row units can be maintained generally constant even when irregular ground terrain is encountered.

It is another object of the present invention to provide an improved row unit support arrangement which permits use of a stationary frame while still allowing the row units to move vertically without raising or lowering the implement frame. It is a further object to provide such an arrangement which facilitates on-the-go opener down force adjustment from the tractor cab. It is yet another object to provide such an arrangement which advantageously utilizes a lever arm to both lift a row unit and adjust down pressure while permitting the row unit to rock vertically with respect to the frame over a substantial range for good ground contour following ability. It is yet a further object to provide such an arrangement wherein down pressure adjustments of the units can be made independently to compensate for the units working in harder ground such as tire tracks.

It is still another object of the present invention to provide an improved row unit support arrangement which provides faster and easier individual row unit lock up. It is a further object to provide such an arrangement which facilitates improved automatic row unit lock up and which permits locking up the units with a single hydraulic cycle.

In accordance with the above objects, a plurality of parallel arm type of openers are mounted on a frame tube, and a hydraulically operated rockshaft is supported directly below the tube. Adjacent each of the openers, a lever arm is fixed for rotation with the rockshaft and, upon rotation of the rockshaft in a first direction, the lever arm engages the parallel arms to lift the opener while the frame tube remains stationary in the vertical direction. A tension spring assembly connected between the parallel arms and the lever arm applies varying down force when the opener is lowered by rotating the rockshaft in the opposite direction. The amount of down pressure can be adjusted for varying conditions by rotation of the rockshaft, and adjustment can be made on-the-go from the tractor cab to compensate for changing soil conditions in a given field. A pressure adjustment in the cab maintains a preselected pressure on the cylinder connected to the rockshaft so that a generally constant average down pressure is provided across the width of the frame.

While the row unit is in the ground working position, the lever arm is offset from the parallel arms to permit the unit to rock vertically with changing ground contours and conditions. A faster opener lift time can be achieved because only the individual openers are being raised rather than the entire machine frame. Each row unit spring assembly is individually adjustable so that down pressure of units which are operating in harder soil such as in tire tracks can be varied over a higher range of values than units operating in looser soil.

These and other objects, features and advantages of the present invention will become apparent to one skilled in the art upon reading the following detailed description in view of the drawings.

BRIEF DESCRIPTION OF THE DRAWINGS

FIG. 2 is a view similar to FIG. 1 but showing the row units in the lowered ground working position.

FIG. 3 is a top view of the forward portion of a row unit and the corresponding lift and down pressure structure for that row unit.

FIG. 4 is a schematic representation of the hydraulic circuit for the assembly.

DETAILED DESCRIPTION OF THE DRAWINGS

Figure 1:
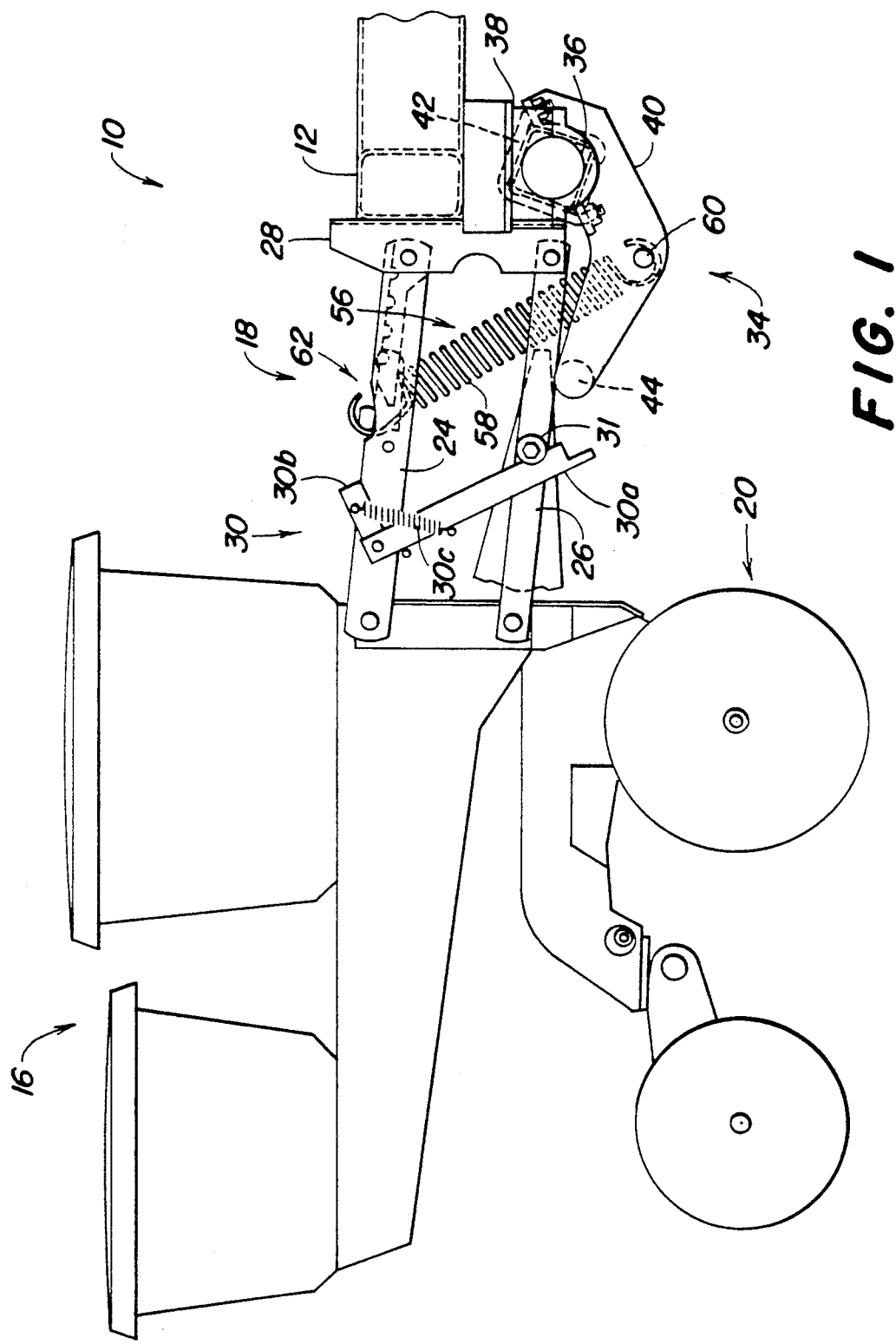
FIG. 1 is a side view of a portion of a planter with the lift and down pressure assembly of the present invention, with the row units raised from the ground working position.

Referring now to FIG. 1, therein is shown an implement 10 having a transversely extending main frame or tool bar 12 adapted for support at a generally constant level above the surface of the ground. Transversely spaced along the width of the frame 12 are a plurality of row units 16 including lift linkage structure 18 supporting one or more earthworking tools 20 for vertical movement relative to the frame. As shown in FIG. 1, the row units 16 are conventional planter row units and the linkage structure 18 is a parallel four-bar linkage having upper and lower lift arms 24 and 26, respectively, connected to the frame 12 by brackets 28.

Selectively engageable locking structure 30, generally of the type shown and described in U.S. Pat. No.

4,738,317 to H. I. Bedney, is located on the linkage structure 18 and includes an engaging link 30a and an over-center strap 30b pivotally connected to one of the upper arms 24, a spring 30c connected between the link and strap, and a link-engaging member 31. The strap 30b is movable between a first position (see FIG. 2) wherein free rocking of the row unit vertically is provided and a second position (see FIG. 1) wherein the row unit will be automatically locked against downward movement after the unit is raised from the ground to a preselected vertical position relative to the frame. When the strap 30b is in the second position (FIG. 1) so that the spring 30c biases the link into engagement with the member 31, the notched lower end of the link 30a moves over the member 31 as the row unit is raised toward the maximum upward position to prevent downward movement of the unit. The locking structure 30 may be disengaged by moving the strap 30b to the rearward position (FIG. 2) and lifting the unit sufficiently to remove tension from the link 30a so that the link pivots free of the member 31.

Lift and down pressure adjustment structure 34 is supported from the frame 12 for raising and lowering the row units 16 and for adjusting the down pressure of the earthworking tools 20 when the row units are in the ground-engaging position. The structure 34 includes a transverse rockshaft 36 supported below the frame 12 by rockshaft brackets 38. Associated with each of the row units 16 are transversely spaced lever arms 40 fixed to the rockshaft 36 by bolts 42 and projecting radially from the rockshaft. The lever arms 40 curve downwardly and rearwardly from their connection with the rockshaft to contact ends 44 which project under the respective lower lift arms 26 of the row unit.

A hydraulic cylinder 50 (FIG. 4) is connected between the frame 12 and the rockshaft 36 and operated from the cab of the towing vehicle by conventional hydraulic controls 51. Extending the cylinder 50 rotates the rockshaft 36 and the lever arms 40 in a first direction (the clockwise direction as viewed in FIG. 2) to move the contact ends 44 into engagement with the lift linkage structure 18 to raise the row units 16 from the ground toward a transport position. Retracting the cylinder rotates the rockshaft and lever arms in the opposite direction (the counterclockwise direction as viewed in FIG. 1) to permit the row units 16 to rock downwardly toward the ground working positions. Once the row units 16 reach the ground working positions, continued rotation of the rockshaft 36 causes the contact ends 44 to disengage the lift linkage structure 18 and move downwardly away from the structure to permit the units to rock freely with changing ground contours and conditions. An adjustable down pressure control 52 located in the tractor cab may be connected to the cylinder 50 to maintain a preset pressure in the base end of the cylinder and provide a constant average down force on the row units 16, as will be described in detail below.

Each row unit 16 includes a down pressure spring assembly 56 which includes a pair of springs 58 tensioned between the lever arms 40 and the upper arms 24 for urging the corresponding earthworking tools 20 downwardly. A spacer assembly 60 extends between and is secured to central portions of the arms 40 for receiving the lower ends of the springs 58. The effective moment arm through which the springs 58 operate to apply downward pressure is adjustable by a spring adjustment 62 which facilitates location of the upper spring ends at various fore-and-aft locations relative to the upper lift arms 24 so that the down pressure for a given rockshaft position may be varied. By changing the moment arm and preload of the springs 58, the range of available rockshaft-adjusted down pressures may be changed. For example, if a row unit has to work in relatively packed soil of a tractor tire track, the upper ends of the springs 58 for that unit are moved rearwardly to increase spring tension and moment arm and provide a range of relatively high down pressures. For soft soil conditions, the spring ends are adjusted forwardly to provide a range of relatively low down pressures. As best appreciated from FIG. 2, spring rate of the springs 58 is selected such that the lowest down pressure adjustment normally used in an available range permits the end of the lever arm 40 to be offset sufficiently from the lower arms 26 to provide a substantial vertical working range for the row unit. Preferably, the spring adjustment 62 is the type used with a commercially available John Deere Model 7200 and 7300 MaxEmerge ® Planters.

In operation, the cylinder 50 is retracted to rotate the arms 40 downwardly so that the row units 16 are lowered into contact with the soil. Continued retraction of the cylinder 50 causes the arm ends 44 to move out of contact with the lower parallel arms 26 and increase the tension of the springs 58 to increase down pressure. If soft soil conditions are encountered which cause the tools 20 to penetrate too deeply, the cylinder 50 is extended to decrease tension in the springs 58. In harder soil areas in the field, the cylinder 50 is retracted to increase down pressure.

The cylinder 50 may be operated automatically to maintain a constant average down pressure on the row units across the width of the frame utilizing the adjustable control 52. With the adjustable control 52 set for automatic operation, a preselected pressure is established at the cylinder to provide a corresponding average down force. The cylinder 50 will extend or retract as necessary to tension the springs 58 to establish the preselected pressure. Therefore, variations in depth of penetration are minimized, even if severe ground surface irregularities are encountered. The average down pressure may be adjusted with a control knob 72 depending on soil conditions and operating practices.

To raise the row units 16 relative to the frame 12, the operator extends the cylinder 50 to rotate the ends 44 into contact with the corresponding lower arms 26. To lock selected row units up in the transport position, for example, when planting in wide row spacings, the lock-up devices 30 are set in the automatic engagement positions when the units are in the lowered position (FIG. 2). The cylinder 50 is extended to raise the row units, and the lock-up devices for the selected row units are automatically moved into the locking position so that upon subsequent retraction of the cylinder 50, the units remain in the upper transport position.

Having described the preferred embodiment, it will become apparent that various modifications can be made without departing from the scope of the invention as defined in the accompanying claims.

I claim:

1. In an agricultural implement adapted for forward movement through a field and having a transversely extending main frame supported a preselected distance above the ground, an earth-working tool for engaging and opening a furrow in the soil, lift arm structure including upper and lower lift arms pivotally connected to the frame and supporting the earth-working tool for movement vertically into and out of soil engagement, structure for raising and lowering the earth-working tool and for adjusting the down pressure of the earth-working tool when the earth-working tool is lowered into soil engagement independently of main frame height adjustments, the structure comprising:
- a rockshaft rotatably supported by the main frame adjacent the earth-working tool;
- means projecting radially from the rockshaft under the lower lift arm for selective engagement of the lower lift arm to raise the earth-working tool upon rotation of the rockshaft in a first direction and for disengagement of the lower lift arm upon rotation of the rockshaft in the direction opposite the first direction;
- means responsive to the spacing between the means projecting and the lift arms for applying an adjustable down pressure to the earth-working tool upon rotation of the rockshaft in the direction opposite the first direction, said means responsive comprising a coil spring stretched between the upper lift arm and the means projecting radially; and
- means for rotating the rockshaft in the first direction to lift the earth-working tool upwardly relative to the frame and for rotating the rockshaft in the direction opposite the first direction for disengaging the means projecting from the lower lift arm and changing the spacing therebetween on-the-go to stretch the coil spring and thereby adjust the down pressure.

2. The invention as set forth in claim 1 further including a moveable lock connected to the lift arm structure, the lock having a disengaged position for facilitating both raising and lowering of the earth-working tool and an engaging position for permitting lifting of the earth-working tool but preventing lowering of the earth-working tool upon rotation of the rockshaft in the first direction after the earth-working tool has been lifted to a preselected height relative to the frame.

3. The invention as set forth in claim 1 wherein the means for rotating the rockshaft comprises a hydraulic cylinder, and means for controlling the pressure of the hydraulic cylinder to automatically maintain a generally constant down pressure regardless of ground irregularities.

4. In an agricultural implement adapted for forward movement through a field and having a transversely extending main frame supported a preselected distance above the ground, a plurality of row units transversely spaced on the frame, each unit including an earth-working tool for engaging and opening a furrow in the soil and fore-and-aft extending lift arm structure pivotally connected to the frame and supporting the earth-working tool for movement vertically into and out of soil engagement, structure for raising and lowering the row units and for adjusting the down pressure of the earth-working tools when the tools are lowered into soil engagement independently of main frame height adjustments, the structure comprising:
- a rockshaft rotatably supported by the main frame adjacent the lower forward end of the lift arm structure;
- means projecting radially from the rockshaft under the row unit lift arm structure for selective engagement of the lift arm structure to raise the earth-working tools upon rotation of the rockshaft in a first direction and for disengagement of the lift arm structure upon rotation of the rockshaft in the direction opposite the first direction;
- means responsive to the spacing between the means projecting and the lift arm structure for applying an adjustable down pressure to the earth-working tools upon rotation of the rockshaft in the direction opposite the first direction, said means responsive including a spring stretched between the means projecting radially and the lift arm structure;
- means for rotating the rockshaft in the first direction to lift the row units upwardly relative to the frame substantially in unison and for rotating the rockshaft in the direction opposite the first direction for disengaging the means projecting from the lift arm structure and changing the spacing therebetween on-the-go to adjust the amount of stretching of the spring and thereby adjust down pressure, and wherein the means for rotating comprises a hydraulic cylinder connected to a source of pressure on the tractor; and
- adjustable pressure means connected to the cylinder for extending and retracting the cylinder automatically to maintain a generally constant average down pressure on the tools as the lift arm structure rocks relative to the means projecting.

5. The invention as set forth in claim 4 including a lock-up device connected to at least one of the row units, the lock-up device including means for selectively and automatically preventing lowering of said at least one of the row units upon rotation of the rockshaft in the first direction to lift the units to preselected positions.

6. The invention as set forth in claim 4 including means for changing the stretched length of the spring between the lift arm structure and the means projecting for a given rockshaft position to thereby change the down pressure for a given rockshaft position.

7. The invention as set forth in claim 4 including means for changing the effective moment arm through which the spring acts to thereby change the down pressure for a given rockshaft position.

* * * * *